Figure 1:
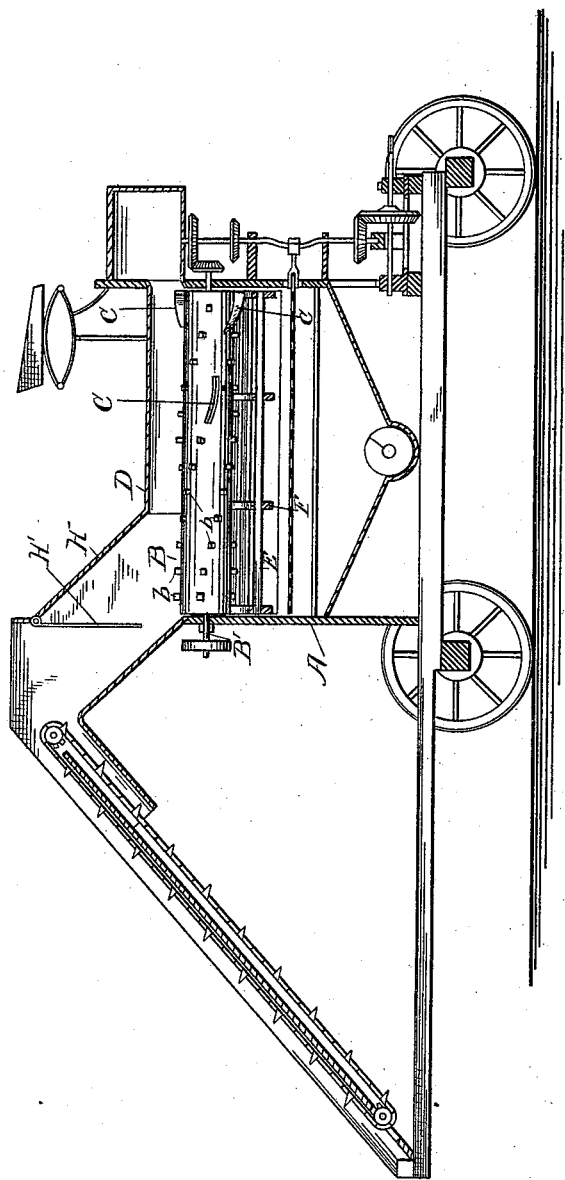

(No Model.) 2 Sheets—Sheet 1.

D. SNELLING.
CORN SHELLER.

No. 396,375. Patented Jan. 15, 1889.

Witnesses.
B. M. Whitaker.
A. M. Best.

Inventor:
David Snelling.
By Coburn & Thacher
Attys.

(No Model.) 2 Sheets—Sheet 2.
D. SNELLING.
CORN SHELLER.
No. 396,375. Patented Jan. 15, 1889.
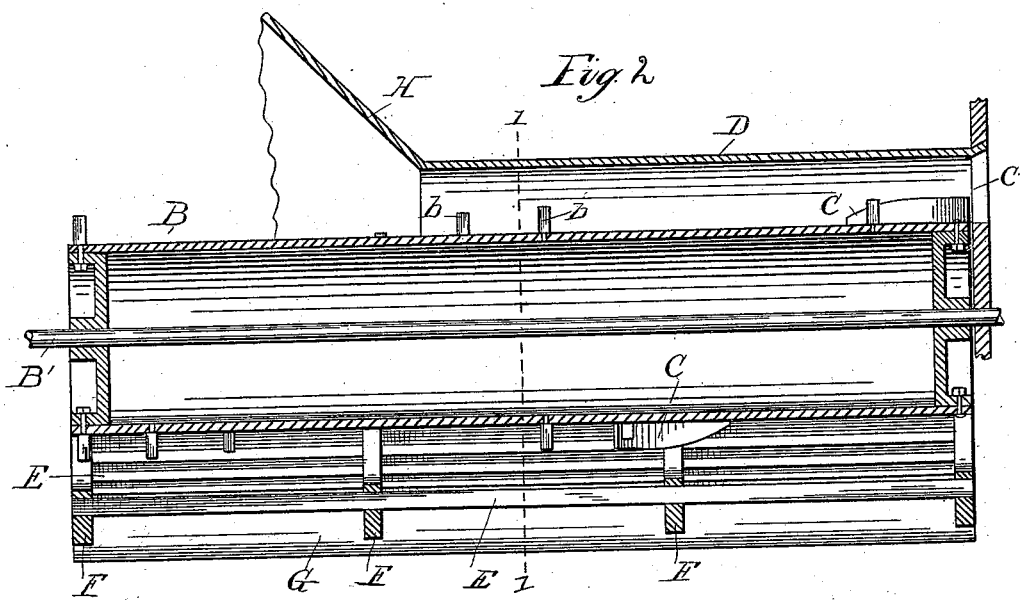
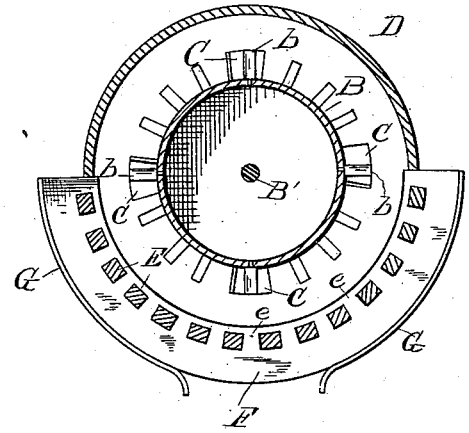
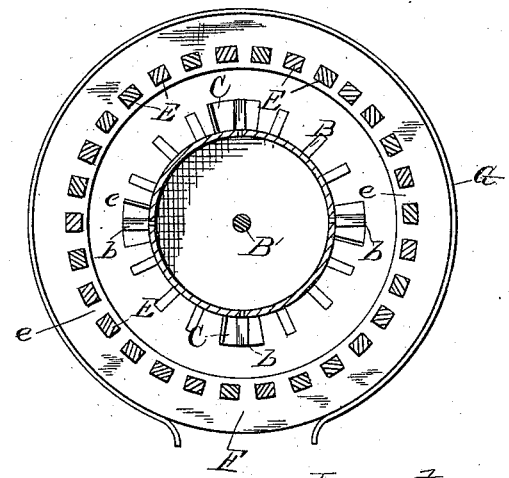
Witnesses.
B. M. Whitaker.
A. M. Best.
Inventor:
David Snelling.
By Coburn & Thacher
Attys.

UNITED STATES PATENT OFFICE.

DAVID SNELLING, OF ADAMS, LA SALLE COUNTY, ASSIGNOR TO THE KING & HAMILTON COMPANY, OF OTTAWA, ILLINOIS.

CORN-SHELLER.

SPECIFICATION forming part of Letters Patent No. 396,375, dated January 15, 1889.

Application filed May 3, 1888. Serial No. 272,703. (No model.)

*To all whom it may concern:*

Be it known that I, DAVID SNELLING, a citizen of the United States, residing in Adams township, in the county of La Salle and State of Illinois, have invented a certain new and useful Improvement in Corn-Shellers, which is fully set forth in the following specification, reference being had to the accompanying drawings, in which—
Figure 1 is a central longitudinal section of a corn-sheller embodying my invention; Fig. 2, a central longitudinal sectional view of the shelling devices enlarged; Fig. 3, a transverse sectional view taken on the line 1 1 of Fig. 2, and Fig. 4 a similar view showing a modification.

Like letters refer to like parts in all the figures of the drawings.

My invention relates to corn-shellers, and more particularly to the shelling mechanism thereof, whereby the grains of corn are removed from the cob, and has for its object to provide a construction whereby the operation of this mechanism may be rendered more certain and efficient.

To these ends my invention consists in certain novel features, which I will now proceed to describe and will then particularly point out in the claims.
In the drawings, A represents the body-casing of a corn-sheller of any suitable construction, and B a cylinder mounted therein upon a suitable shaft, B', driven from any suitable source of power. The cylinder B is preferably hollow and constructed of metal, and is provided with shelling-teeth *b*, arranged in several rows spirally around the said cylinder. Upon the exterior of the cylinder B there are arranged a series of wings, C, having a height substantially equal to the height of the teeth *b*. These wings are of any suitable length and extend along the surface of the cylinder in a spiral direction, which preferably corresponds to the spiral direction of the rows of teeth *b*. In the present instance I have shown these wings as arranged in two annular series around the cylinder B, one series of two wings being located at that end of the cylinder where the shelled cobs are discharged and the other series of two wings being arranged at about the middle of the cylinder. Of course any desired number and arrangement of these wings may be employed. The cylinder B is surrounded by a suitable casing, which, acting in conjunction with the toothed cylinder B, serves to remove the grain from the ears of corn. In Figs. 1, 2, and 3 I have shown this casing as composed of a cylindrical upper portion, D, of ordinary construction, while the lower portion is composed of square or angular bars E, extending lengthwise parallel to the cylinder and mounted in suitable supports, F. The bars E are placed a suitable distance apart, forming intermediate spaces, *e*, through which the shelled corn may pass downward, while the cobs are prevented from passing through said spaces. The supports F are semicircular in form, and in the present instance I have shown four of these supports, although any suitable number may be employed, according to the length of the cylinder and of the bars E, each of the supports being arranged just in front of a series of the spiral wings C. The bars are connected thereto by passing through correspondingly-shaped holes in the supports, which are thus caused to project slightly inward above the said bars, as shown in Fig. 3.

Instead of forming only a portion of the casing of longitudinal bars, the whole casing may be thus constructed, as shown in Fig. 4, in which case the supports F will be circular in form, and the entire cylinder B will be surrounded by a cylindrical casing composed of square or angular bars E, mounted in said supports. In either case the supports F serve for the attachment of a casing, G, which prevents the shelled corn from escaping, said casing being open at the bottom to permit the shelled corn to drop through.

H indicates an inclined spout, by means of which the ears of corn are fed to the shelling mechanism. In this spout is arranged a valve, H', hinged at the top of the spout and swinging freely within the same.

The operation of the apparatus is as follows: The corn which is discharged into the feeding-spout H passes freely by the valve H', which swings toward the top of the spout and permits the ears of corn to pass freely downward. At the same time, however, in case any of the ears of corn are thrown back by the action of the shelling-cylinder, the valve H' will prevent their flying out of the mouth of the spout H, which result it accomplishes in an obvious manner. The shelling-case, composed of the angular bars E, operates in conjunction with the teeth b of the cylinder B to shell the corn from the cob, and forms a cheap and at the same time highly-efficient means for accomplishing this result. The spiral position of the teeth tends to feed the ears lengthwise along the shelling-cylinder and its case while being shelled, and this feeding motion is rendered more positive and expeditious by means of the spiral wings C. These wings also serve to force the cobs over the inwardly-projecting supports F and prevent clogging at these points. The wings C at the end of the cylinder serve to positively feed the cobs out and discharge them at outlet C', provided for that purpose.

It is obvious that various modifications in the details of construction and arrangement of parts may be made without departing from the principle of my invention, and I therefore do not wish to be understood as limiting myself strictly to the precise details hereinbefore described, and shown in the drawings.

Having thus described my invention, what I claim as new, and desire to secure by Letters Patent, is—

1. In a corn-sheller, a shelling-cylinder provided with teeth arranged spirally on the cylinder and short spiral wings arranged at intervals in the spiral rows of teeth, in combination with a tubular casing surrounding said cylinder, substantially as and for the purposes specified.

2. In a corn-sheller, the casing D, composed of bars E and circular supports F, in combination with the shelling-cylinder B, provided with teeth b, arranged in spiral rows, and short spiral wings C, mounted on said cylinder adjacent to the circular supports F of the casing, substantially as and for the purposes specified.

DAVID SNELLING.

Witnesses:
F. G. ALLEN,
T. Y. MICKLE.